April 23, 1968 R. E. ROBERTS 3,379,805
METHOD OF MAKING CORRUGATED HOSE
Filed Dec. 14, 1964 3 Sheets-Sheet 1
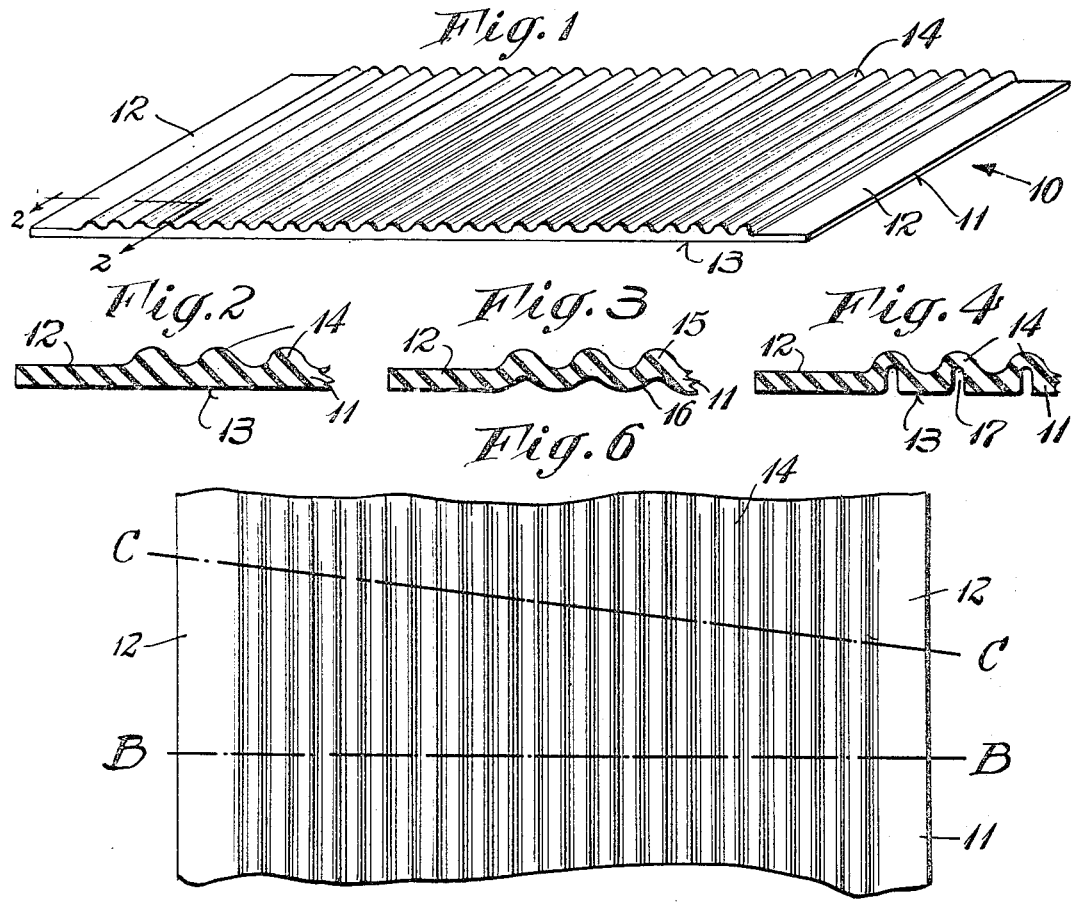
INVENTOR.
Robert E. Roberts
BY
Johnson and Kline
ATTORNEYS April 23, 1968 R. E. ROBERTS 3,379,805
METHOD OF MAKING CORRUGATED HOSE
Filed Dec. 14, 1964 3 Sheets-Sheet 2
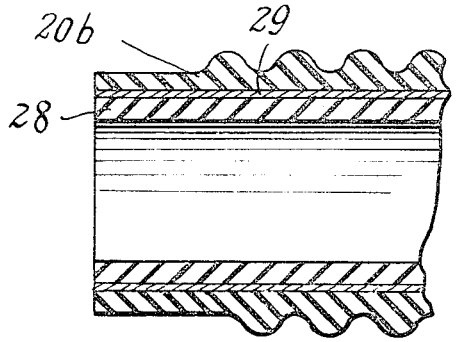
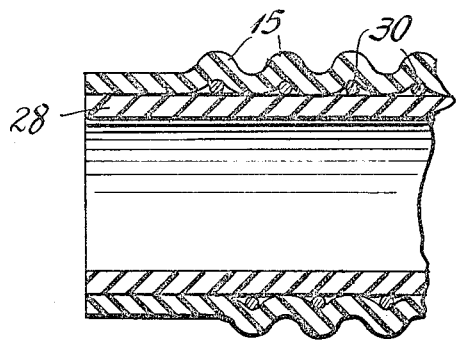
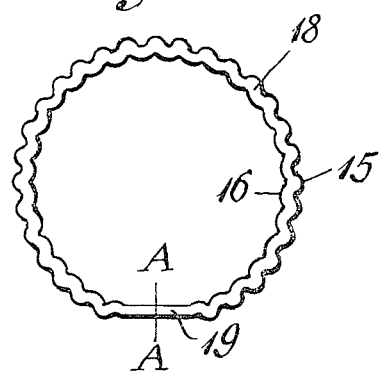
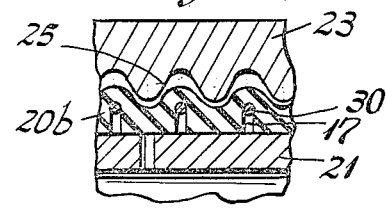
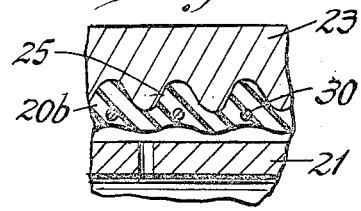
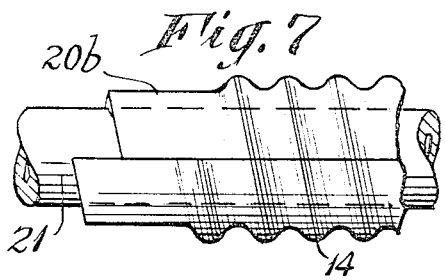
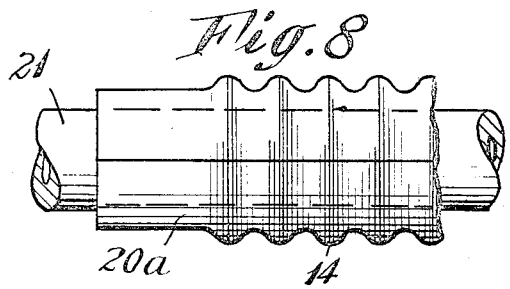
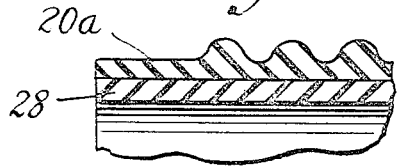
INVENTOR.
Robert E. Roberts
BY
Johnson and Kline
ATTORNEYS

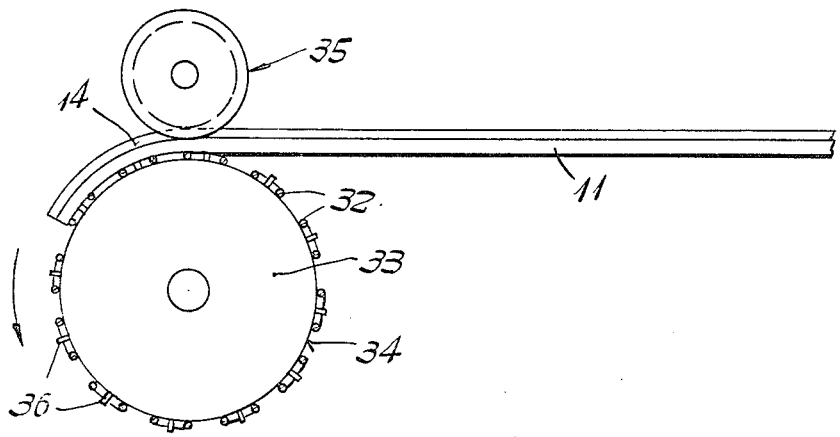
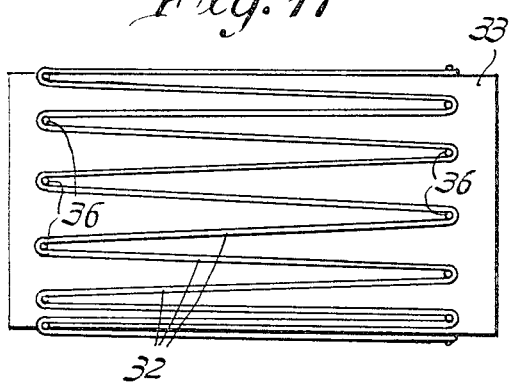
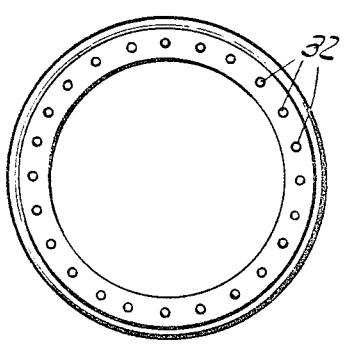
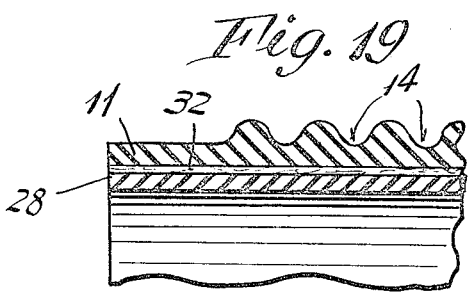

United States Patent Office 3,379,805
Patented Apr. 23, 1968

3,379,805
METHOD OF MAKING CORRUGATED HOSE
Robert E. Roberts, Wilton, Conn., assignor to Fred T. Roberts & Company, Fairfield, Conn., a partnership
Filed Dec. 14, 1964, Ser. No. 418,198
18 Claims. (Cl. 264—94)

ABSTRACT OF THE DISCLOSURE

A method of making corrugated hose by extruding a strip having longitudinal corrugations therein, cutting the strip to form a blank having the corrugations running transversely of the longitudinal axis of the blank, folding the blank about said longitudinal axis to form an open-ended tube with the ends of the corrugations in the abutting side edges aligned to provide a helical or annularly corrugated hose, which basic method can be varied to provide the desired fabric or wire reinforcements and/or protective components in the hose.

---

It is an object of the present invention to provide a novel method for making a corrugated wall hose which method produces a reduction in the cost of production and is capable of being employed to provide a variety of hose structures.

In carrying out the invention an elongate member, which may be a flat strip or a hollow tube, is extruded from an elastomeric material in indefinite lengths and provided on at least one surface with corrugations extending longitudinally of the axis of the member. The member is then cut transversely to provide an elongate panel or blank having a length at least equal to the length of the hose to be made and having the corrugations extending across the longitudinal axis of the panel. The panel is folded and formed into a tube with the ends of the corrugations exposed in the side edges of the panel in alignment. By properly cutting the panel from the strip, the hose can be made with annular corrugations or helical corrugations. The edges of the tube are then secured together and the tube is set into a hose having precisely corrugated side walls.

In extruding the elongate member as a strip, it can be formed with smooth edge surfaces and a flat surface on one face and a corrugated surface on the opposite face, or it can have complementary longitudinally corrugated surfaces on the two faces thereof, or the strip can be provided with corrugations on one face and reinforcement-receiving portions or slots on the other face in line with the corrugations. When the extruded member is in the form of an elongate tube, it is provided with longitudinally extending surface configurations, as above noted, for most of its circumference and with an elongate longitudinally extending uncorrugated portion through which the tube is severed. The severed tube is flattened to form a strip provided with longitudinally corrugated surfaces and a flat band on each edge of the strip.

In accordance with the present invention, the panels can be used alone to form the hose or can be readily laminated with a liner, preferably of suitable elastomeric material, and formed into a hose having varying use characteristics. Further, the method permits a reinforcing fabric layer to be disposed over the liner and the tube formed thereover and secured into a homogeneous mass.

Another form of hose can be made by the present method by providing wire or other strand reinforcements which can be embedded in the tube formed by the panel or disposed over the liner with the same lying in the complementary inner corrugations or in the reinforcing slots in the tubular member to embed the reinforcements in the construction.

Thus, it will be seen that the present invention lends itself to a simplified method of making any one of a number of hose types, each having a corrugated surface and some having reinforcing means therein.

Other features and advantages of the invention will be apparent from the specification and claims when considered in connection with the accompanying drawings in which:

FIGURE 1 shows an extruded strip having smooth edge portions and longitudinal corrugations therebetween in the upper surface.

FIG. 2 is an enlarged fragmentary sectional view taken on line 2—2 of FIG. 1.

FIG. 3 is a view similar to FIG. 2 showing the strip provided with complementary longitudinal corrugations on the opposite surfaces thereof.

FIG. 4 is a view similar to FIG. 2 having longitudinal corrugations on one surface and reinforcement-receiving portions or slots on the other surface.

FIG. 5 is an end view of an extruded elongate member in tubular form.

FIG. 6 is a plan view of an elongate strip showing the transverse lines of cutting to make panels therefrom.

FIG. 7 shows a folded panel positioned on a mandrel to provide the helical corrugations on the hose.

FIG. 8 is a view similar to FIG. 7 showing the panel mounted on a mandrel for providing annular corrugations.

FIG. 9 is a fragmentary view of the mandrel in position in a cavity of a sectional mold.

FIG. 10 is a view similar to FIG. 9 showing the tube expanded into molding contact with the wall of the cavity in the mold.

FIG. 11 is a fragmentary view of a tube positioned over a liner.

FIG. 12 is a fragmentary view of a tube positioned over a liner and having a fabric reinforcement therebetween.

FIG. 13 is a view similar to FIG. 11 showing the tube of FIG. 3 positioned over a liner with a strand reinforcement disposed therebetween and lying in the inner corrugated surface of the tube.

FIG. 14 is a view similar to FIG. 9 showing the form of the invention of FIG. 4 with the strand reinforcement therein.

FIG. 15 is a view similar to FIG. 10 showing the reinforced hose molded in the mold.

FIG. 16 is a diagrammatic view of the device for applying transverse strands.

FIG. 17 shows one form of strand arrangement on the drum.

FIG. 18 showing another form of strand arrangement on the drum.

FIG. 19 is a view similar to FIG. 12 showing the longitudinal strands.

FIG. 20 is a sectional view of the hose of FIG. 19.

As shown in the drawings, an elongate member 10 of elastomeric material is extruded in indefinite lengths. The material can be natural or synthetic rubber or organic plastics such as polyethylene, polyvinyl chloride, vinyl copolymers and the like. In the form of the invention shown in FIG. 1, the elongate member is formed as a flat strip 11 with smooth side edge portions 12, a smooth bottom surface 13 and longitudinal corrugations 14 on the upper surface. An enlarged detail view of a section of this strip is shown in FIG. 2. If desired, the elongate strip can be formed with the smooth edge portions 12 and complementary longitudinally extending corrugations 15, 16 on the opposite faces thereof as shown in FIG. 3. In another form of the invention the elongate strip can be provided with a section, as shown in FIG. 4, wherein there is a smooth edge portion 12, the longitudinal corrugations 14 in the upper surface and a flat undersurface 13 with longitudinal reinforcement-receiving portions or slots 17 aligned with the corrugations on the upper surface.

If desired, the elongate member can also be extruded in the form of a hollow tubular element 18 with the inner and outer surfaces formed to have the desired configurations. In the form shown in FIG. 5, the tubular member has complementary longitudinal inner and outer corrugations 15, 16 of the type shown in FIG. 3 and has an uncorrugated longitudinally extending portion 19. When the tubular element is split along the line A—A and is flattened out, it provides a strip of material similar to that shown in FIG. 1 having smooth edge portions and intermediate corrugated surfaces.

Preferably, the elongate strips are of a width at least equal to the length of the hose section to be formed. The strips are then cut transversely therof at spaced intervals sufficient to form panels or blanks capable of being folded into a tube to produce the finished hose.

If the strip is cut perpendicular to the side edge, as indicated by the line B—B, it will form a panel 20a which, when longitudinally folded around a mandrel 21, as shown in FIG. 8, and the ends of the corrugations in the abutting side edges of the panel are aligned, will produce an annularly corrugated tube which can be formed into a hose. If the strip is cut along the line C—C at an acute angle to the side edge, it will form a panel 20b which, when longitudinally folded around a mandrel 21, as shown in FIG. 7, and the ends of the corrugations in the abutting side edges of the panel are aligned, will produce a tube to form a hose having a helical corrugated outer surface. If desired, the abutting edges can be stitched or otherwise secured together and the tube cured or set on the mandrel.

However, it is at present preferred to put the mandrel with the tube thereon in a usual multiple section mold to mold them. Such a mold is disclosed in Patent No. 2,897,840. As shown in the fragmentary view of FIG. 9, the mold sections 22, 23 have a cavity 24 therein, the walls 25 of which are corrugated in the same manner as the tube on the mandrel. The mandrel and tube are positioned in the mold so that the corrugations on the tube are aligned with the corrugations of the wall in the mold cavity. Steam or hot air is forced through a bore 26 of the mandrel and out through the ports 27 in the surface of the mandrel to the interior of the tube and forces it out against the walls of the mold cavity to produce a molded corrugated hose such as shown in FIG. 10.

Should it be desired to provide a hose having different internal and external characteristics, a liner 28 can be laminated with the blank 20a forming the tube by being inserted within the tube, as shown in FIG. 11, prior to the molding operation so that the liner and tube can be bonded together. And, if it is desired, a fabric reinforcing member 29 in the form of a sleeve or wrap can be disposed between the liner and the tube, as shown in FIG. 12, and the whole formed into a homogeneous wall. This enables one to provide a hose having different properties such as oil resistance or resistance to chemicals or other materials on the inside and a wear-resistant or distinctively colored outer surface on the hose.

Under some circumstances it is desired to provide a hose having a wire 30 or other resilient strand reinforcement therein. The reinforcement will conform to the annular or helical corrugations and can be positioned between the liner and tube. As shown in FIG. 13, the outer tube, having a cross-section of the type shown in FIG. 3, can be positioned thereover with the reinforcements disposed in the corrugations on the inner surface. This assembly can be then formed or molded into a homogeneous wall structure to provide a hose having a corrugated reinforced wall structure, or the reinforcements 30 can be placed into the reinforcing-receiving portions 17 of the hose of FIG. 4 prior to the tube 20b being put on the mandrel 21. The mandrel, with the assembled tube and reinforcement, is then inserted into the mold cavity, as shown in FIG. 14, and expanded and molded under heat and pressure which will cause the elastomeric material to flow to produce the hose as shown in FIG. 15.

Thus it will be seen that the present method of extruding and forming elongate strips having longitudinally extending corrugations, cutting panels from elongate strips in such a way that the corrugated surfaces run transversely to the axis of the panel and forming the panels into a tube can produce at a relatively low cost a wide variety of hose structures having annular or helical corrugated surfaces, different types of reinforcements and differences in the internal and external characteristics of the material of the hose body.

In some instances it may be desired to provide the hose with longitudinal strands to prevent inadvertent elongation of the hose. This can be readily accomplished by the present invention by providing transverse strands 32, preferably textile, on the elongate extruded member 11 which will extend longitudinally of the blank formed therefrom and thereafter formed into a hose.

While the strands can be readily applied by hand, it is preferred to apply the strand, as shown in FIG. 16, by passing the freshly extruded strip 11 over a rotating drum 33 having a surface 34 conforming to the undersurface of the strip. The drum rotates at the same surface speed as the speed of the strip and carries the transversely extending strands 32 on the surface thereof. By pressing the tacky strip against the strands on the drum by pressure rollers 35, preferably located in the grooves 14 in the extruded strip, the strands will adhere to the tacky surface of the strip. Since the strand is releasably held on the drum by marginal pins 36 it will be readily transferred thereto. In one form of the invention the strands engage alternate pins to provide a strand pattern over the surface as shown in FIG. 17, while in another form of the invention the strand engages opposing pins to form a pattern, as shown in FIG. 18, of parallel strands. The panels which are cut from the strip as previously explained will therefore have longitudinally extending strands secured thereto. The panel is formed into a tube or is preferably wrapped around a central tube or liner 28 which can be resistant to the material to be conducted by the hose, with the longitudinal strands 32 extending longitudinally of the hose as shown in FIG. 19 and disposed in spaced relation around the liner as shown in FIG. 20. The longitudinally reinforced panel and liner are molded into a unitary structure as hereinbefore described.

While the longitudinally reinforced panel can be used in a hose construction having reinforcing turns where it is desired to resist radial deformation as well as longitudinal, it is herein illustrated, for purpose of simplicity, in a hose construction having only the spaced longitudinal strands.

Variations and modifications may be made within the scope of the claims and portions of the improvements may be used without others.

I claim:

1. The method of making a corrugated hose comprising the steps of forming an elongate member having longitudinal corrugations on at least one surface thereof, cutting said member transversely of the longitudinal axis to form an elongate blank with said corrugations extending transversely of the blank, folding the blank longitudinally with the side edges in abutting relation to form an open-ended tube with the ends of the corrugations on the longitudinally extending abutting side edges of the blank in alignment, and securing said abutting side edges together and setting said tube to form a hose having precisely corrugated side walls.

2. The method of making a corrugated hose comprising the steps of extruding an elongate flat strip having longitudinal corrugations on at least one surface thereof, cutting said strip transversely of the longitudinal axis to form an elongate blank with said corrugations extending transversely of the blank and terminating at the side edges thereof, folding said blank longitudinally into an open-ended tube with the ends of the corrugations on the side edges of the blank aligned and forming longitudinally extending joints parallel to said axis, and securing said side edges together and setting said tube to form a hose having precisely corrugated side walls.

3. The method of making a corrugated hose comprising the steps of extruding an elongate member having complementary longitudinally corrugated opposed surfaces thereon, cutting said member transversely of the longitudinal axis to form an elongate blank with said corrugations extending transversely of the blank, folding the blank longitudinally with the side edges in abutting relation to form an open-ended tube with the ends of the corrugations on the longitudinally extending side edges of the blank in alignment, and securing said side edges together and setting said tube to form a hose having precisely corrugated side walls.

4. The method of making a corrugated hose comprising the steps of extruding an elongate member having longitudinal corrugations on one surface and reinforcement-receiving grooves on the other surface in line with said corrugations, cutting said member transversely of the longitudinal axis to form an elongate blank with said corrugations extending transversely of the blank, folding the blank longitudinally with the side edges in abutting relation to form an open-ended tube with the ends of the corrugations on the longitudinally extending side edges of the blank in alignment, inserting a reinforcement in said groove, and securing said side edges together and setting said tube to form a hose having precisely corrugated reinforced side walls.

5. The method of making a corrugated hose comprising the steps of extruding an elongate tubular member having longitudinal corrugations on at least one surface thereof, splitting said tube longitudinally, opening said split member to form a flat strip, cutting said strip transversely of the longitudinal axis thereof to form an elongate blank with said corrugations extending transversely of the blank, folding the blank longitudinally with the side edges in abutting relation to form an open-ended tube with the ends of the corrugations on the longitudinally extending side edges of the blank in alignment, and securing said side edges together and setting said tube to form a hose having precisely corrugated side walls.

6. The method of making a corrugated hose comprising the steps of extruding an elongated tubular member having a longitudinal smooth band and longitudinal corrugations on the surface thereof, splitting said tube longitudinally through said smooth band, opening said split member to form a flat strip having smooth surfaces at each edge, cutting said strip transversely of the longitudinal axis thereof to form an elongate blank with said corrugations extending transversely of the blank and the smooth portions at each end, folding the blank longitudinally with the side edges in abutting relation to form an open-ended tube with the ends of the corrugations on the longitudinally extending side edges of the blank in alignment, and securing said side edges together and setting said tube to form a hose having smooth end portions and precisely corrugated side walls.

7. The method of making a corrugated hose comprising the steps of extruding an elongate member having longitudinal corrugations on at least one surface thereof, cutting said member transversely of the longitudinal axis to form an elongate blank with said corrugations extending transversely of the blank, folding said blank longitudinally with the side edges in abutting relation to form an open-ended tube with the abutting ends of the corrugations aligned, inserting said tube into a mold cavity having corrugated walls similar to the corrugations on the surface of the tube, with said tube corrugations aligned with the corrugations in said wall, and applying internal pressure to the tube to force the material of the tube into engagement with the walls of the mold cavity and form a molded hose having a precisely corrugated wall.

8. The method of making a corrugated hose comprising the steps of extending an elongate strip having a width at least equal to the length of a hose to be formed and having longitudinal corrugations on at least one surface thereof, cutting said strip perpendicularly to the side edge thereof to form an elongate blank with said corrugations extending transversely of the blank, folding the blank longitudinally with said cut edges abutting and forming an open-ended tube with the ends of the corrugations on the cut edges of the blank in alignment, and setting said tube to form a hose having precisely annularly corrugated side walls.

9. The method of making a corrugated hose comprising the steps of extruding an elongate strip having a width at least equal to the length of a hose to be formed and having longitudinal corrugations on at least one surface thereof and reinforcement-receiving portions on the opposite surface thereof in predetermined relation to said corrugations, cutting said strip perpendicularly to the side edge thereof to form an elongate blank with said corrugations extending transversely of the blank, folding the blank longitudinally with the side edges in abutting relation to form an open-ended tube with the ends of the corrugations on the longitudinally extending side edges of the blank in alignment, positioning annular reinforcements into said reinforcement-receiving portions, and setting said tube to form a hose having precisely annularly corrugated reinforced side walls.

10. The method of making a corrugated hose comprising the steps of extruding an elongate strip having a width at least equal to the length of a hose to be formed and having longitudial corrugations on at least one surface thereof, cutting said strip at an acute angle to the side edge thereof to form an elongate blank with said corrugations extending transversely of the blank, folding the blank longitudinally with the side edges in abutting relation to form an open-ended tube with the ends of the corrugations on the longitudinally extending side edges of the blank in alignment to form helical corrugations thereon, and setting said tube to form a hose having precisely helically corrugated side walls.

11. The method of making a corrugated hose comprising the steps of extruding an elongate strip having a width at least equal to the length of a hose to be formed and having longitudinal corrugations on at least one surface thereof and reinforcement-receiving portions on the opposite surface thereof in predetermined relation to said corrugations, cutting said strip at an acute angle to the side edge thereof to form an elongate blank with said corrugations extending transversely of the blank, folding the blank longitudinally with the side edges in abutting relation to form an open-ended tube with the ends of the corrugations on the longitudially extending side edges of the blank in alignment to form helical corrugations thereon, positioning a helical reinforcement in said reinforcement-receiving portion, and setting said tube to form a hose having precisely helically corrugated reinforced side walls.

12. The method of making a corrugated hose comprising the steps of extruding an elongate flat strip and forming longitudinal corrugations on at least one surface thereof, cutting said strip transversely of the longitudial axis to form an elongate blank with said corrugations extending transversely of the blank, folding said blank longitudinally with said cut edges abutting and forming an open-ended tube with the ends of the corrugations aligned, inserting said tube into a mold cavity having corrugated walls similar to the corrugations on the surface of the tube and with said tube corrugations aligned with the corrugations in said wall, and applying internal pressure to the tube to force the material of the tube into engagement with the walls of the mold cavity and form a molded hose having a precisely corrugated wall.

13. The method of making a corrugated hose comprising the steps of extruding an elongate member having longitudinal corrugations on at least one surface thereof, cutting said member transversely of the longitudinal axis to form an elongate blank with said corrugations extending transversely of the blank, forming a tubular liner, folding the blank longitudially around the tubular liner with the cut edges abutting with the ends of the corrugations on the cut edges of the blank in alignment, and securing together and setting said blank and tubular liner to form an open-ended hose having precisely corrugated side walls.

14. The method of making a corrugated hose comprising the steps of extruding an elongate member having longitudinal corrugations on at least one surface thereof, cutting said member transversely of the longitudinal axis to form an elongate blank with said corrugations extending transversely of the blank, forming a tubular liner, applying a reinforcement over the liner, folding the blank longitudinally around the tubular liner and reinforcement with the cut edges abutting with the ends of the corrugations on the side edges of the blank in alignment, and securing together and setting said blank, reinforcement and tubular liner to form a hose having precisely corrugated side walls.

15. The method of making a corrugated hose comprising the steps of extruding an elongate strip having smooth side edge portions and longitudinal corrugations on the midportion of at least one surface thereof, cutting said member transversely of the longitudinal axis thereof to form an elongate blank with said corrugations extending transversely of the blank, forming a tubular liner, positioning a reinforcement over the liner, wrapping said blank longitudinally around said liner and reinforcement with the cut edges abutting with the corrugated surface exposed to form a tube, inserting said tube into a mold cavity having corrugations in the walls similar to the corrugations on the surface of the tube, with said tube corrugations aligned with the corrugations in said wall, and applying internal pressure to the tube to force the material of the tube into engagement with the walls of the mold cavity and form a molded hose having smooth ends and a precisely corrugated reinforced wall.

16. The method of making a corrugated hose comprising the steps of extruding an elongate tubular member having longitudinal corrugations on at least one surface thereof, splitting said tube longitudinally, opening said split member to form a flat strip, cutting said strip transversely of the longitudinal axis thereof to form an elongate blank with said corrugations extending transversely of the blank, folding the blank into an open-ended tube with the cut edges abutting and the corrugations extending transversely of the longitudinal axis of the tube, inserting said tube into a mold cavity having corrugated walls similar to the corrugations on the surface of the tube, with said tube corrugations aligned with the corrugations in said wall, and applying internal pressure to the tube to force the material of the tube into engagement with the walls of the mold cavity and form a molded hose having a precisely corrugated wall.

17. The method of making a corrugated hose comprising the steps of extruding an elongate member having longitudinal corrugations thereon, securing spaced strands on a surface thereof to extend transversely of the member, cutting said member transversely of the longitudinal axis to form an elongate blank having said spaced strands extending longitudinally thereof with said corrugations extending transversely of the blank, folding the blank longitudinally with the side edges in abutting relation to form an open-ended tube with the abutting ends of the corrugations on the side edges of the blank in alignment, and setting said tube to form a hose having precisely corrugated side walls.

18. The method of making a corrugated hose comprising the steps of extruding an elongate member having longitudinal corrugations thereon, securing spaced strands on a surface thereof to extend transversely of the member, cutting said member transversely of the longitudinal axis to form an elongate blank having said spaced strands extending longitudinally thereof with said corrugations extending transversely of the blank, wrapping the blank with said cut edges abutting and forming an open-ended tube around a tubular liner with the ends of the corrugations on the cut edges of the blank in alignment, and molding the superposed liner and longitudinally reinforced panel to form a reinforced hose having precisely corrugated side walls.

References Cited
UNITED STATES PATENTS

| | | | |
|---|---|---|---|
| 2,599,268 | 6/1952 | Maculan | 264—177 |
| 2,750,631 | 6/1956 | Johnson | 264—177 |
| 2,897,840 | 8/1959 | Roberts et al. | 264—94 |
| 2,952,039 | 9/1960 | Jaffe | 264—177 |
| 3,024,496 | 3/1962 | Colombo | 264—286 |
| 3,063,888 | 11/1962 | Howard et al. | 156—187 |
| 3,157,204 | 11/1964 | Phillips | 156—187 |
| 3,222,728 | 12/1965 | Roberts et al. | 264—94 |

FOREIGN PATENTS 531,421   8/1955   Italy.

ROBERT F. WHITE, *Primary Examiner.*

S. I. LANDSMAN, *Assistant Examiner.*

UNITED STATES PATENT OFFICE

CERTIFICATE OF CORRECTION

Patent No. 3,379,805            April 23, 1968

Robert E. Roberts

It is certified that error appears in the above identified patent and that said Letters Patent are hereby corrected as shown below:

Column 5, line 52, "elongated" should read -- elongate -- Column 6, line 8, "extending" should read -- extruding --; line 38, "longitudial" should read -- longitudinal --. Column 6, line 59 and Column 7, line 10, "longitudially", each occurrence, should read -- longitudinally --.

Signed and sealed this 9th day of September 1969.

(SEAL)
Attest:

Edward M. Fletcher, Jr.           WILLIAM E. SCHUYLER, JR.
Attesting Officer                  Commissioner of Patents